J. J. DAOUST.
BAKING OVEN.
APPLICATION FILED APR. 9, 1919.
1,364,255.
Patented Jan. 4, 1921.
3 SHEETS—SHEET 1.
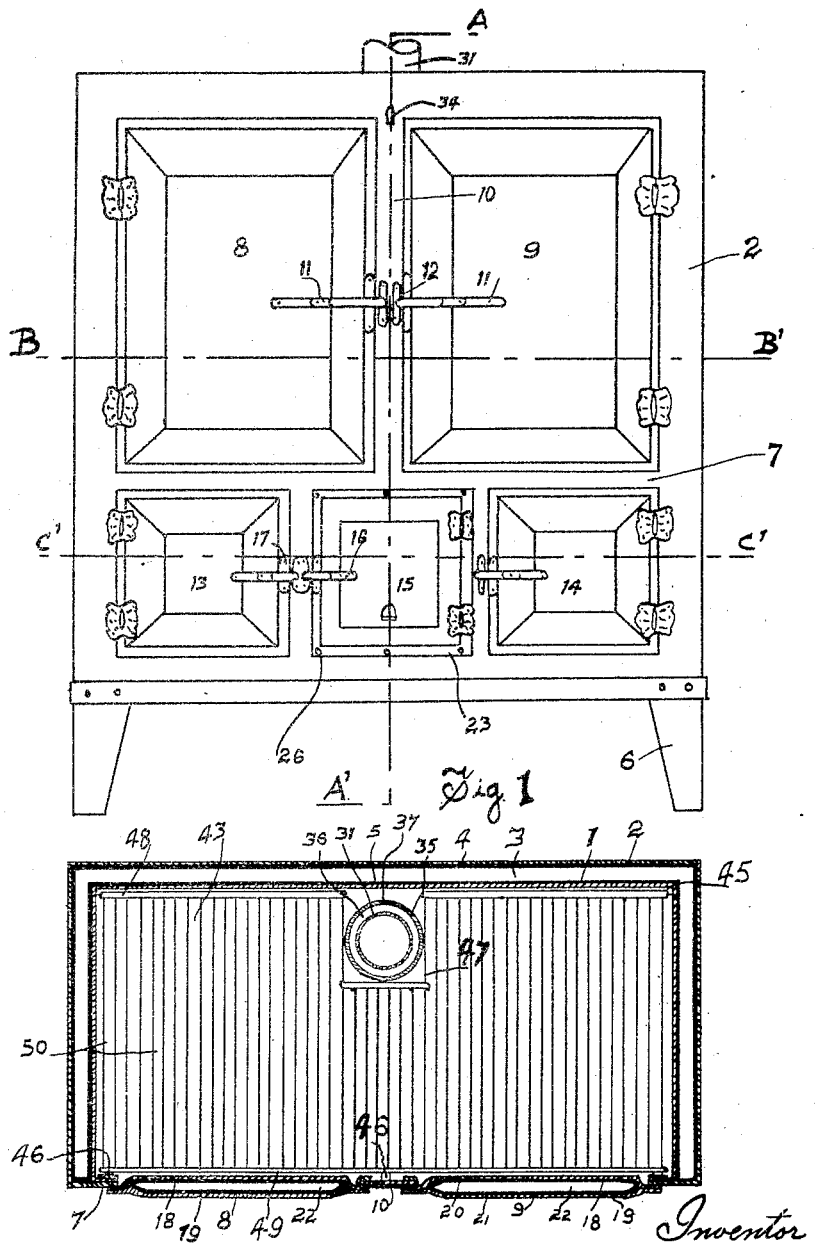

J. J. DAOUST.
BAKING OVEN.
APPLICATION FILED APR. 9, 1919.

1,364,255.

Patented Jan. 4, 1921.
3 SHEETS—SHEET 2.

Inventor
J. J. Daoust
By
Fahnestock & Coy
attys.

J. J. DAOUST.
BAKING OVEN.
APPLICATION FILED APR. 9, 1919.

1,364,255.

Patented Jan. 4, 1921.
3 SHEETS—SHEET 3.

Inventor
J. J. Daoust

UNITED STATES PATENT OFFICE.

JEAN J. DAOUST, OF ST. BONIFACE, MANITOBA, CANADA.

BAKING-OVEN.

1,364,255.  Specification of Letters Patent.  Patented Jan. 4, 1921.

Application filed April 9, 1919. Serial No. 288,735.

*To all whom it may concern:*

Be it known that I, JEAN J. DAOUST, of the city of St. Boniface, in the Province of Manitoba, Canada, have invented certain new and useful Improvements in Baking-Ovens, of which the following is the specification.

The invention relates to improvements in baking ovens and the principal object of the invention is to provide an oven having good capacity and arranged and constructed so that the interior of the oven can be heated evenly and with a comparatively small amount of fire, and to arrange it so that it is particularly well insulated and will hold its heat for a considerable period. A further object of the invention is to construct the oven in a simple, durable and inexpensive manner, and so that it can be readily looked after by the average housewife. A further object of the invention is to arrange the fire box so that there will not be excessive heat directly radiated from the fire box, thereby preventing the possibility of scorching the material being baked and located close to the fire box. A still further object of the invention is to construct the oven so that the shelves thereof can be readily removed for cleaning purposes and further, to construct the oven so that the interior temperature can be readily regulated.

With the above objects in view the invention consists essentially in the arrangement and construction of parts hereinafter more particularly described and later pointed out in the appended claims, reference being had to the accompanying drawings in which:—

Figure 1 represents a front view of the complete baking stove.

Fig. 5 is a horizontal sectional view through the stove, the section being taken in the plane denoted by the line B—B′ Fig. 1.

In the drawings like characters of reference indicate corresponding parts in each figure.

Figure 3:
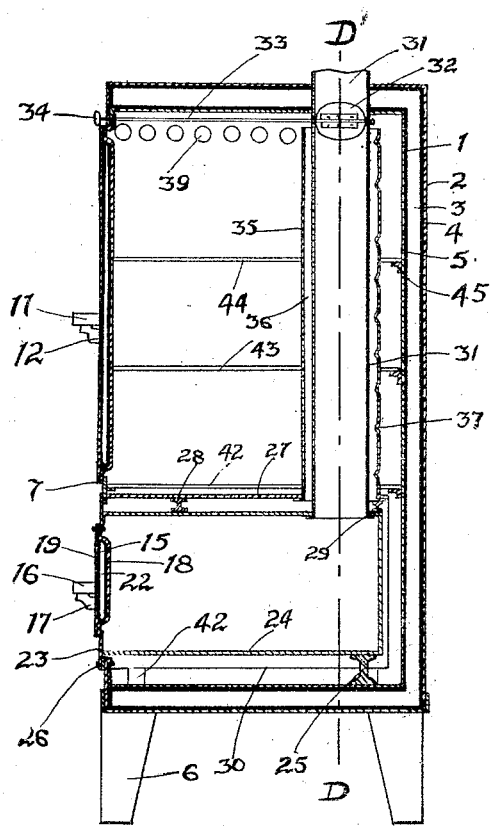
Fig. 3 is a vertical sectional view centrally through the stove, the section being taken in the plane denoted by the line A—A′ Fig. 1.
Figure 2:
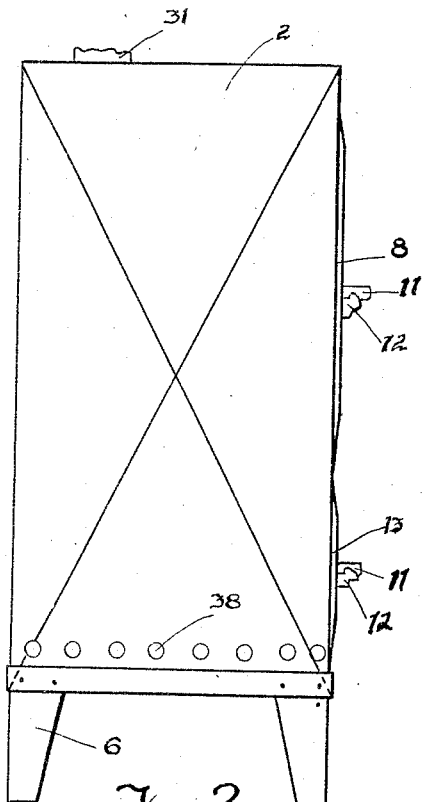
Fig. 2 is an end view of the same.
Figure 4:
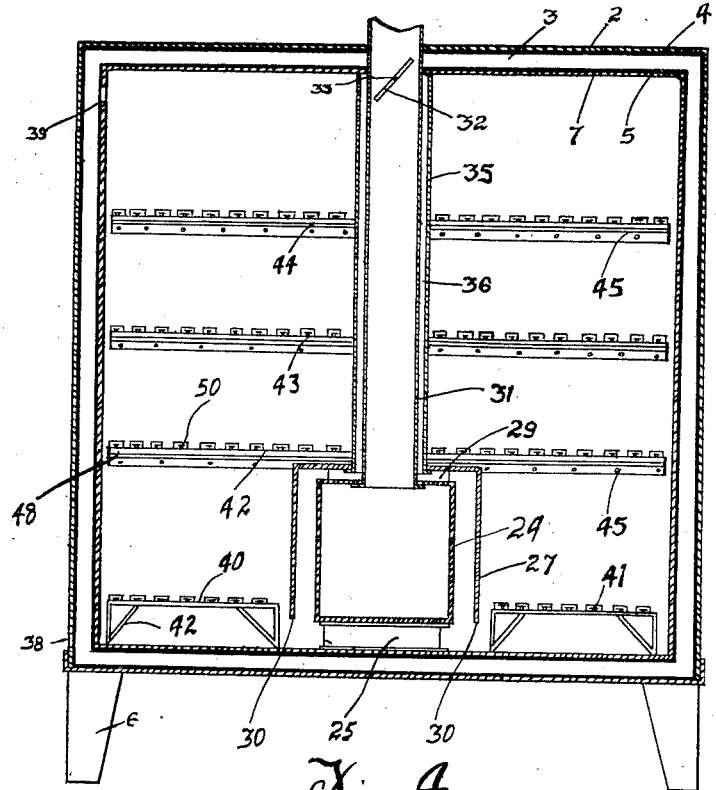
Fig. 4 represents a longitudinal sectional view through the stove, the section being taken in the plane denoted by the line D—D′ Fig. 3.
Figure 6:
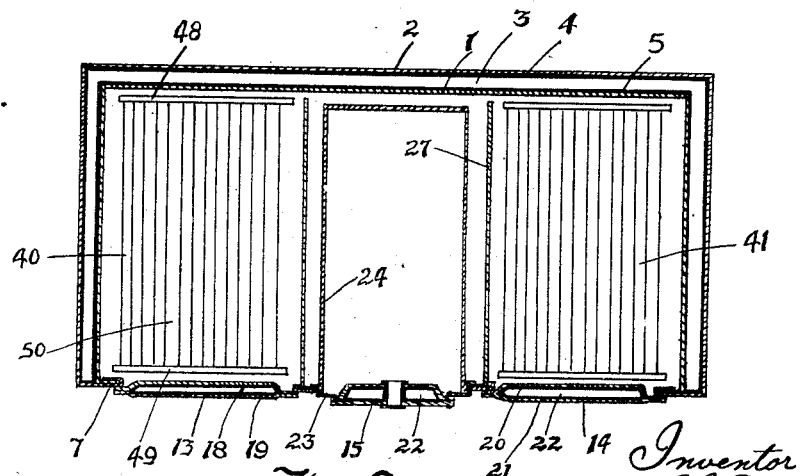
Fig. 6 is a horizontal sectional view through the stove, the section being taken in the plane denoted by the line C—C′ Fig. 1.

The stove body comprises two substantially rectangular inner and outer casings 1 and 2 spaced apart to provide an intervening air space 3 which entirely surrounds the inner casing except at the front where the doors, later disclosed, are placed.

The outer casing is provided with an asbestos lining 4 and the inner casing is inclosed within a lining 5, this lining being applied on the tops, bottoms, ends and backs of the casings. The outer casing is supporting on corner legs 6.

The front 7 of the oven is provided with two hinged upper oven doors 8 and 9 which close against a divisional strip 10 provided in the front and are fitted with the customary latches and catches 11 and 12 for holding the doors closed. Beneath the doors 8 and 9 I locate a hinged side door 13 and 14 and a central fire door 15, all of which are supplied with latches and catches 16 and 17 of the ordinary form.

All the doors are double-walled, as indicated at 18 and 19, and are asbestos lined as indicated at 20 and 21 and have an air space 22 reserved between the linings.

The fire door 15 is carried by a sheet metal door frame 23 which is fastened to the forward flared ends of the fire box 24 which, it will be observed, is square in cross section and extends backwardly to within a short distance of the back wall of the inner casing and has the rear end supported by an I-beam 25 resting on the bottom of the inner casing. The door frame is actually fastened to the front of the stove by riveting or bolting, as indicated at 26, through the flange of the fire box to the front of the stove. The fire box is covered by a protecting substantially U-shaped plate 27 which is supported directly from the top of the fire box by a pair of inserted front and rear I-beams 28 and 29. This plate has the front end thereof engaging the front of the oven and the rear end thereof stopping short of the rear inner wall of the stove and the sides thereof terminating as indicated at 30 in a location near the bottom level of the fire box. A chimney or flue pipe 31 extends upwardly from the rear end of the fire box through the stove and out the tops of the casings. The flue is provided toward the upper end with a damper 32 located on a damper rod 33 passing forwardly of the oven and terminating in a hand grip 34 whereby the damper can be manipulated from the front of the oven.

The flue 31 is inclosed within a protecting pipe 35 which is spaced from the flue to reserve an annular heating chamber 36 and the lower end of the pipe 35 is attached to the horizontal part of the protecting plate while the upper end terminates in a location just at the top of the inner casing.

The rear side of the pipe 35 is provided with a number of air holes 37 passing from top to bottom. The ends of the outer casing are provided at the bottom with a series of vent ports 38 which open to the air space between the casings, and the ends of the inner casing are perforated at the top to provide a series of vent ports 39 opening to the air space between the casings.

40 and 41 represent similar lower shelves fitted with suitable legs 42 which support the shelves from the bottom of the inner casing and in a location immediately to the sides of the protecting plate. These shelves are approached through the doors 13 and 14.

Above the shelves 40 and 41 I provide three other full length shelves 42, 43 and 44 all of similar construction and having their rear edges carried by angle bars 45 permanently secured to the rear wall of the inner casing and their front edges mounted on spaced angle brackets 46 secured to the front of the oven. In order to allow for the pipe and flue, the said shelves 42, 43 and 44 are cut away as indicated at 47, this being best shown in Fig. 5 of the drawings. In actual practice the shelves are all formed from lengthwise extending metal strips 48 and 49 connected by suitably spaced cross strips 50 soldered or otherwise permanently fastened to the lengthwise extending strips.

The shelves 42, 43 and 44 are all approached through the doors 8 and 9.

From the above it will be obvious that I have provided a large capacity oven, as there are several distinct shelves in it, and that the interior of the oven is particularly well insulated from the exterior air so that once it is heated it will retain its heat for a considerable period.

When the stove is in use, a fire is kindled in the fire box and after the oven has reached the proper temperature the material to be baked is placed therein on the various shelves. It will be here observed that the protecting sheet prevents the heat directly radiated from the fire box, from scorching the material placed particularly on the lower shelves 40, 41 and 42, and that the heated air in the chamber between the plate and the fire box is caused to circulate downwardly under the sides of the plate and out at the ends so that it is well distributed. The pipe 35 also prevents the direct heat in the flue from scorching the material on the upper shelves and the hot air between the flue and the pipe is caused to circulate upwardly out of the upper end of the pipe 35 where it is distributed in the oven. The vent ports 39 prevent the excessive heating of the top of the oven and the vent ports 38 allow of sufficient cool air to enter the air space and prevent the oven from heating the room in which it is placed.

What I claim as my invention is:—

1. In a baking oven the combination with an insulated casing provided with entrance doors, of a fire box located centrally at the bottom and within the casing, a flue communicating with the rear end of the fire box and passing upwardly within and out the top of the casing, a protecting plate suspended from the fire box and passing across and down the sides of the same, a pipe enveloping the flue and spaced therefrom and having the lower end secured to and opening through the protecting plate and the upper end terminating at the top of the casing, trays resting on the bottom of the casing and located to the outer sides of the sides of the protecting plate and spaced upper trays carried by the walls of the casing and in a location above the protecting plate, said upper trays having portions thereof cut away to receive the pipe surrounding the flue.

2. In a baking oven, inner and outer insulated casings having an air space therebetween and provided at the front with upper entrance doors, a lower centrally located fire door and side entrance doors located at opposite sides of the fire door, a fire box spaced from the bottom of the inner casing and passing rearwardly of the oven and accessible through the fire door, a flue extending upwardly from the rear end of the fire box through the oven and out through the tops of the casings, a substantially U-shaped protecting plate spaced from and straddling the fire box and passing lengthwise thereof, a protecting pipe spaced from and enveloping the flue and having the lower end secured to and opening through the plate and the upper end terminating at the inner casing, lower trays supported from the bottom of the inner casing and located between the protecting plate and the side walls of the inner casing and accessible through the lower entrance doors and spaced upper trays suspended from the walls of the inner casing and accessible through the upper entrance doors.

3. In a baking oven, inner and outer insulated casings having an air space therebetween and provided at the front with upper entrance doors, a lower centrally located fire door and side entrance doors located at opposite sides of the fire door, vent openings passing through the ends of the outer casing at the bottom and communicating with the air space, and vent openings passing through the ends of the inner casing at the top and communicating with the air space, a fire box spaced from the bottom of the inner casing and passing rearwardly of the oven and accessible through the fire door, a flue extending upwardly from the rear end of the fire box through the oven and out through the tops of the casings, an adjustable damper within the upper end of the flue, a substantially U-shaped protecting plate spaced from and straddling the fire box and passing lengthwise thereof, a protecting pipe spaced from and enveloping the flue and having the lower end secured to and opening through the plate and the upper end terminating at the top of the inner casing, and provided at the rear side with a vertically extending series of air openings, lower trays supported from the bottom of the inner casing and located between the protecting plate and the side walls of the inner casing and accessible through the lower entrance doors and spaced upper trays suspended from the walls of the inner casing and accessible through the upper entrance doors and having portions thereof cut away to receive the protecting pipe.

Signed at Winnipeg, this 15th day of March, 1919.

JEAN J. DAOUST.

In the presence of—
G. S. ROXBURGH,
K. B. WAKEFIELD.